(12) United States Patent
Agrawal et al.

(10) Patent No.: US 7,910,022 B2
(45) Date of Patent: *Mar. 22, 2011

(54) PHOSPHORESCENT COMPOSITIONS FOR IDENTIFICATION

(75) Inventors: Satish Agrawal, Concord, MA (US); Edward Kingsley, Stow, MA (US)

(73) Assignee: Performance Indicator, LLC, Lowell, MA (US)

( * ) Notice: Subject to any disclaimer, the term of this patent is extended or adjusted under 35 U.S.C. 154(b) by 280 days.

This patent is subject to a terminal disclaimer.

(21) Appl. No.: 11/808,266

(22) Filed: Jun. 7, 2007

(65) Prior Publication Data

US 2008/0121818 A1 May 29, 2008

Related U.S. Application Data

(60) Provisional application No. 60/844,647, filed on Sep. 15, 2006.

(51) Int. Cl.
*C09D 5/22* (2006.01)
*G01N 21/64* (2006.01)

(52) U.S. Cl. ......... 252/301.33; 252/301.36; 252/301.34; 106/31.64; 106/31.32; 106/31.15

(58) Field of Classification Search ............. 252/301.33, 252/301.36, 301.34; 106/31.64, 31.32, 31.15
See application file for complete search history.

(56) References Cited

U.S. PATENT DOCUMENTS

| | | | |
|---|---|---|---|
| 2,522,704 A | 9/1950 | Laval | |
| 2,527,365 A | 10/1950 | Leverenz | |
| 2,787,558 A | 4/1957 | Wadely | |
| 3,022,189 A | 2/1962 | Malmquist | |
| 3,212,898 A | 10/1965 | Gerreta | |
| 3,508,810 A | 4/1970 | Baltzer | |
| 3,522,143 A | 7/1970 | Motter | |
| 3,560,211 A | 2/1971 | Fotland | |
| 3,562,172 A | 2/1971 | Ono | |
| 3,578,602 A | 5/1971 | Ono | |
| 3,595,804 A | 7/1971 | Martin | |
| 3,627,690 A | 12/1971 | Casella | |
| 3,650,812 A | 3/1972 | Nordstrom et al. | |
| 3,654,190 A | 4/1972 | Levine | |
| 3,666,352 A | 5/1972 | Wagner et al. | |
| 3,668,189 A | 6/1972 | Goetz | |
| 3,714,181 A | 1/1973 | Lantos | |
| 3,738,299 A | 6/1973 | Packler et al. | |

(Continued)

FOREIGN PATENT DOCUMENTS

EP          0 159 678 A1   10/1985

(Continued)

OTHER PUBLICATIONS

C.J. Bartelson and F. Grum, "Optical Radiation Measurements: vol. 5—Visual Measurements," Academic Press, Inc. (1984).

(Continued)

*Primary Examiner* — C. Melissa Koslow
(74) *Attorney, Agent, or Firm* — Burns & Levinson LLP; Orlando Lopez

(57) ABSTRACT

Disclosed are photoluminescent compositions containing photoluminescent phosphorescent materials and photoluminescent fluorescent materials whose emission signature lies partly or fully in the infrared region of the electromagnetic spectrum. Also disclosed are photoluminescent compositions containing photoluminescent phosphorescent materials and photoluminescent fluorescent materials whose emission signature lies partly or fully in the infrared region of the electromagnetic spectrum which are high in intensity and high in persistence.

22 Claims, 3 Drawing Sheets

U.S. PATENT DOCUMENTS

| | | |
|---|---|---|
| 3,873,390 A | 3/1975 | Cornell et al. |
| 3,884,697 A | 5/1975 | Inove et al. |
| 3,912,677 A | 10/1975 | Baker et al. |
| 3,924,027 A | 12/1975 | Saito |
| 3,936,970 A | 2/1976 | Hodges |
| 3,957,678 A | 5/1976 | Dikhoff et al. |
| 3,980,602 A | 9/1976 | Jakubauskas |
| 4,025,661 A | 5/1977 | Moscony |
| 4,028,118 A | 6/1977 | Nakasuji et al. |
| 4,105,583 A | 8/1978 | Glover et al. |
| 4,121,011 A | 10/1978 | Glover et al. |
| 4,130,760 A | 12/1978 | Fanselow et al. |
| 4,188,449 A | 2/1980 | Lu et al. |
| 4,208,300 A | 6/1980 | Grauisse |
| 4,210,953 A | 7/1980 | Stone |
| 4,211,813 A | 7/1980 | Gravisse |
| 4,215,010 A | 7/1980 | Hovey et al. |
| 4,268,134 A | 5/1981 | Gulati et al. |
| 4,286,957 A | 9/1981 | Le Naour-Sene |
| 4,287,229 A | 9/1981 | Watanabe |
| 4,289,497 A | 9/1981 | Hovey |
| 4,304,833 A | 12/1981 | Foley |
| 4,342,668 A | 8/1982 | Hovey et al. |
| 4,362,799 A | 12/1982 | Kondo et al. |
| 4,375,373 A | 3/1983 | Abe et al. |
| 4,379,100 A | 4/1983 | Salisbury et al. |
| 4,421,560 A | 12/1983 | Kito et al. |
| 4,425,161 A | 1/1984 | Shibahashi |
| 4,425,377 A | 1/1984 | Deal et al. |
| 4,440,672 A | 4/1984 | Chu |
| 4,451,504 A | 5/1984 | Gallaro et al. |
| 4,567,019 A | 1/1986 | Lawton |
| 4,602,263 A | 7/1986 | Borror et al. |
| 4,617,468 A | 10/1986 | Shiraishi et al. |
| 4,629,583 A | 12/1986 | Goguen |
| 4,637,698 A | 1/1987 | Kwak et al. |
| 4,663,214 A | 5/1987 | Coburn, Jr. |
| 4,681,791 A | 7/1987 | Shibahashi et al. |
| 4,695,336 A | 9/1987 | Coburn, Jr. |
| 4,698,296 A | 10/1987 | Lewis |
| 4,699,473 A | 10/1987 | Chu |
| 4,717,710 A | 1/1988 | Shimizu et al. |
| 4,717,770 A | 1/1988 | Sato et al. |
| 4,720,356 A | 1/1988 | Chu |
| 4,729,907 A | 3/1988 | Deal et al. |
| 4,734,295 A | 3/1988 | Lin |
| 4,759,453 A | 7/1988 | Paetzold |
| 4,781,647 A | 11/1988 | Doane |
| 4,818,096 A | 4/1989 | Heller et al. |
| 4,826,550 A | 5/1989 | Shimizu |
| 4,826,977 A | 5/1989 | Heller et al. |
| 4,830,875 A | 5/1989 | Lindmayer |
| 4,835,475 A | 5/1989 | Hanakura et al. |
| 4,857,228 A | 8/1989 | Kabay |
| 4,880,667 A | 11/1989 | Welch |
| 4,884,860 A | 12/1989 | Brown |
| 4,898,895 A | 2/1990 | Masuoka et al. |
| 4,910,252 A | 3/1990 | Yonehara et al. |
| 4,913,544 A | 4/1990 | Rickwood |
| 4,921,727 A | 5/1990 | Datta et al. |
| 4,927,180 A | 5/1990 | Trundle et al. |
| 4,943,896 A | 7/1990 | Johnson |
| 5,007,647 A | 4/1991 | Gulick |
| 5,023,015 A | 6/1991 | Lagos |
| 5,045,706 A | 9/1991 | Tanaka et al. |
| 5,066,818 A | 11/1991 | Gemert et al. |
| 5,132,043 A | 7/1992 | Deboer |
| 5,132,045 A | 7/1992 | Osaka et al. |
| 5,135,591 A | 8/1992 | Vockel |
| 5,149,568 A | 9/1992 | Beck |
| 5,176,905 A | 1/1993 | Ohno et al. |
| 5,185,390 A | 2/1993 | Fischer et al. |
| 5,219,625 A | 6/1993 | Matsunami et al. |
| 5,221,288 A | 6/1993 | Kamada |
| 5,223,330 A | 6/1993 | Vockel |
| 5,248,916 A | 9/1993 | Tong et al. |
| 5,260,252 A | 11/1993 | Frangie |
| 5,292,549 A | 3/1994 | Van Ooij et al. |
| 5,294,375 A | 3/1994 | Kampe et al. |
| 5,321,069 A | 6/1994 | Owens |
| 5,344,191 A | 9/1994 | Chang |
| 5,352,649 A | 10/1994 | Shibahashi et al. |
| 5,356,149 A | 10/1994 | Kane |
| 5,378,897 A | 1/1995 | Suzuki |
| 5,387,458 A | 2/1995 | Pavelka et al. |
| 5,389,093 A | 2/1995 | Howell |
| 5,391,327 A | 2/1995 | Ligas |
| 5,395,673 A | 3/1995 | Hunt |
| 5,409,797 A | 4/1995 | Hosoi et al. |
| 5,424,006 A | 6/1995 | Murayama et al. |
| 5,427,415 A | 6/1995 | Chang |
| 5,435,994 A | 7/1995 | Valenty |
| 5,439,785 A | 8/1995 | Boston et al. |
| 5,445,611 A | 8/1995 | Eppstein et al. |
| 5,446,150 A | 8/1995 | Rickwood |
| 5,480,482 A | 1/1996 | Novinson |
| 5,490,344 A | 2/1996 | Bussiere |
| 5,536,046 A | 7/1996 | Chang |
| 5,558,187 A | 9/1996 | Aberle |
| 5,581,090 A | 12/1996 | Goudjil |
| 5,605,734 A | 2/1997 | Yeh |
| 5,607,621 A | 3/1997 | Ishihara |
| 5,618,063 A | 4/1997 | Chang |
| 5,630,869 A | 5/1997 | Amon et al. |
| 5,644,352 A | 7/1997 | Chang et al. |
| 5,658,500 A | 8/1997 | Kumar et al. |
| 5,674,437 A | 10/1997 | Geisel |
| 5,692,895 A | 12/1997 | FarzinNia et al. |
| 5,698,301 A | 12/1997 | Yonetani |
| 5,708,181 A | 1/1998 | Hama et al. |
| 5,716,723 A | 2/1998 | Van Clef |
| 5,717,282 A | 2/1998 | Oomen et al. |
| 5,728,758 A | 3/1998 | Smith |
| 5,730,961 A | 3/1998 | Goudjil |
| 5,731,658 A | 3/1998 | Lengyel et al. |
| 5,744,233 A | 4/1998 | Opitz et al. |
| 5,753,146 A | 5/1998 | Van Gemert et al. |
| 5,770,115 A | 6/1998 | Misura |
| 5,774,997 A | 7/1998 | Gruen, Jr. |
| 5,789,015 A | 8/1998 | Gupta et al. |
| 5,789,021 A | 8/1998 | Dooms et al. |
| 5,807,265 A | 9/1998 | Itoigawa et al. |
| 5,823,891 A | 10/1998 | Winskowicz |
| 5,833,349 A | 11/1998 | Apple |
| 5,839,718 A | 11/1998 | Hase et al. |
| 5,885,482 A | 3/1999 | Asaoka et al. |
| 5,914,076 A | 6/1999 | Schloss |
| 5,914,222 A | 6/1999 | Morrison et al. |
| 5,916,541 A | 6/1999 | Stewart |
| 5,938,544 A | 8/1999 | Winskowicz |
| 5,938,554 A | 8/1999 | Moster et al. |
| 5,973,034 A | 10/1999 | Mori et al. |
| 5,975,696 A | 11/1999 | Kohan |
| 5,976,717 A | 11/1999 | Holdik et al. |
| 5,985,381 A | 11/1999 | Conner |
| 5,989,135 A | 11/1999 | Welch |
| 6,005,024 A | 12/1999 | Anders et al. |
| 6,013,122 A | 1/2000 | Klitzman et al. |
| 6,013,980 A | 1/2000 | Goel et al. |
| 6,027,810 A | 2/2000 | Dahlquist |
| 6,046,455 A | 4/2000 | Ribi et al. |
| 6,048,347 A | 4/2000 | Erdman |
| 6,060,428 A | 5/2000 | Chang |
| 6,072,000 A | 6/2000 | Harui et al. |
| 6,111,054 A | 8/2000 | Haubennestel et al. |
| 6,117,362 A | 9/2000 | Yen et al. |
| 6,130,781 A | 10/2000 | Gauvin |
| 6,139,779 A | 10/2000 | Small |
| 6,165,234 A | 12/2000 | Kanakkannatt |
| 6,177,487 B1 | 1/2001 | Sapper et al. |
| 6,196,241 B1 | 3/2001 | Doolan |
| 6,201,057 B1 | 3/2001 | Porter |
| 6,207,077 B1 | 3/2001 | Burnell-Jones |
| 6,267,911 B1 | 7/2001 | Yen et al. |
| 6,268,440 B1 | 7/2001 | Kudo et al. |
| 6,268,458 B1 | 7/2001 | Soane et al. |
| 6,271,333 B1 | 8/2001 | Okuhira |

| | | |
|---|---|---|
| 6,277,037 B1 | 8/2001 | Winskowicz et al. |
| 6,290,873 B1 | 9/2001 | Takahashi |
| 6,294,258 B1 | 9/2001 | Gentile |
| 6,312,782 B1 | 11/2001 | Goldberg et al. |
| 6,344,233 B1 | 2/2002 | Jamil et al. |
| 6,358,160 B1 | 3/2002 | Winskowicz |
| 6,359,048 B1 | 3/2002 | Van Duynhoven |
| 6,375,864 B1 | 4/2002 | Phillips et al. |
| 6,391,492 B1 | 5/2002 | Kawakanii et al. |
| 6,465,791 B1 | 10/2002 | Ribi et al. |
| 6,489,018 B2 | 12/2002 | Senga et al. |
| 6,499,995 B1 | 12/2002 | Schwartz |
| 6,500,555 B1 | 12/2002 | Khaldi |
| 6,508,732 B1 | 1/2003 | Romberger et al. |
| 6,514,594 B1 | 2/2003 | Wei et al. |
| 6,553,696 B1 | 4/2003 | Foster, Sr. |
| 6,596,816 B1 | 7/2003 | Haubennestel et al. |
| 6,599,444 B2 | 7/2003 | Burnell-Jones |
| 6,617,468 B2 | 9/2003 | Haubennestel et al. |
| 6,623,382 B2 | 9/2003 | Winskowicz |
| 6,623,791 B2 | 9/2003 | Sadvary et al. |
| 6,638,160 B2 | 10/2003 | Yoshitomi |
| 6,660,184 B2 | 12/2003 | Singh et al. |
| 6,660,324 B2 | 12/2003 | O'Rourke et al. |
| 6,710,127 B2 | 3/2004 | Haubennestel et al. |
| 6,746,724 B1 | 6/2004 | Robertson et al. |
| 6,750,266 B2 | 6/2004 | Bentsen et al. |
| 6,773,628 B2 | 8/2004 | Kinno |
| 6,800,684 B2 | 10/2004 | Hayashi et al. |
| 6,807,909 B1 | 10/2004 | Coots |
| 6,814,760 B2 | 11/2004 | Anderson et al. |
| 6,818,310 B2 | 11/2004 | Namiki et al. |
| 6,833,191 B2 | 12/2004 | Bayless |
| 6,861,467 B2 | 3/2005 | Nakano |
| 6,870,024 B2 | 3/2005 | Haubennestel et al. |
| 6,878,076 B2 | 4/2005 | Winskowicz |
| 6,894,124 B2 | 5/2005 | Matsuno et al. |
| 6,905,634 B2 | 6/2005 | Burnell-Jones |
| 6,953,536 B2 | 10/2005 | Yen et al. |
| 6,990,903 B2 | 1/2006 | Butland |
| 7,033,712 B2 | 4/2006 | Liang et al. |
| 7,050,387 B2 | 5/2006 | Tsujita et al. |
| 7,087,810 B2 | 8/2006 | Medsker |
| 7,229,572 B2 | 6/2007 | Hampden-Smith et al. |
| 7,547,894 B2 * | 6/2009 | Agrawal et al. ............ 250/461.1 |
| 2002/0034475 A1 | 3/2002 | Ribi |
| 2002/0068166 A1 | 6/2002 | Senga et al. |
| 2003/0219531 A1 | 11/2003 | Parsapour |
| 2003/0222247 A1 | 12/2003 | Putman et al. |
| 2004/0009833 A1 | 1/2004 | Selevan |
| 2004/0033352 A1 | 2/2004 | Massa et al. |
| 2004/0169474 A1 | 9/2004 | Hampden-Smith et al. |
| 2004/0187417 A1 | 9/2004 | Thomas |
| 2005/0031838 A1 | 2/2005 | Lagunowich et al. |
| 2005/0224764 A1 | 10/2005 | Ma et al. |
| 2005/0235848 A1 | 10/2005 | Butland |

FOREIGN PATENT DOCUMENTS

| | | |
|---|---|---|
| EP | 0 311 157 B1 | 4/1989 |
| EP | 0 318 999 B1 | 6/1989 |
| EP | 0 417 490 B1 | 3/1991 |
| EP | 0 438 836 B1 | 7/1991 |
| EP | 0 713 894 B1 | 5/1996 |
| EP | 0 825 249 B1 | 2/1998 |
| EP | 0 838 475 B1 | 4/1998 |
| EP | 0 851 452 B1 | 7/1998 |
| EP | 0 977 167 A1 | 2/2000 |
| EP | 1 028 001 B1 | 8/2000 |
| EP | 1 176 575 A1 | 1/2002 |
| EP | 1 283 106 A1 | 2/2003 |
| EP | 1 306 872 A2 | 5/2003 |
| EP | 1 514 910 A1 | 3/2005 |
| GB | 2153804 A | 8/1985 |
| JP | 60-032234 A | 2/1985 |
| JP | 1249436 A | 10/1989 |
| JP | 403261596 | 11/1991 |
| JP | 404358145 A | 12/1992 |
| JP | 9-132648 A | 5/1997 |
| JP | 2000294130 A | 10/2000 |
| JP | 2001-329047 A | 11/2001 |
| WO | WO 88/007903 | 10/1988 |
| WO | WO 01/10551 A1 | 2/2001 |
| WO | WO 01/79360 A1 | 10/2001 |
| WO | WO 02/31065 A3 | 4/2002 |
| WO | WO 02/098993 A1 | 12/2002 |
| WO | WO 02/098995 A1 | 12/2002 |
| WO | WO 03/018651 A1 | 3/2003 |
| WO | WO 03/044092 A3 | 5/2003 |
| WO | WO 2004/075624 A3 | 9/2004 |
| WO | WO 2004/112482 A2 | 12/2004 |
| WO | WO 2005/017048 A3 | 2/2005 |
| WO | WO 2005/018370 A1 | 3/2005 |
| WO | WO 2005/029163 A1 | 3/2005 |
| WO | WO 2005/035461 A1 | 4/2005 |
| WO | WO 2005/063484 A1 | 7/2005 |
| WO | WO 2005/066278 A1 | 7/2005 |
| WO | WO 2005/066995 A3 | 7/2005 |

OTHER PUBLICATIONS

Yen and Weber, "Inorganic Phosphors—Compositions, Preparation and Optical Properties," CRC Press (2004), pp. 453-459.

* cited by examiner

PHOSPHORESCENT COMPOSITIONS FOR IDENTIFICATION

CROSS-REFERENCE TO RELATED APPLICATIONS

This application claims priority to U.S. Provisional Patent Application Ser. No. 60/844,647, filed Sep. 15, 2006, titled "Phosphorescent Compositions and Methods for Identification Using the same", which is incorporated by reference herein for all purposes.

BACKGROUND OF THE INVENTION

The present invention relates generally to the field of photoluminescent compositions. In particular, the present invention relates to photoluminescent compositions containing photoluminescent phosphorescent materials and photoluminescent fluorescent materials whose emission signature lies partly or fully in the infrared region of the electromagnetic spectrum. As well, the invention relates to photoluminescent compositions containing photoluminescent phosphorescent materials and photoluminescent fluorescent materials whose emission signature lies partly or fully in the infrared region of the electromagnetic spectrum which are high in intensity and high in persistence.

Photoluminescent materials and compositions that contain photoluminescent phosphorescent materials with emissions in the visible region of the electromagnetic spectrum have been disclosed. For example, metal sulfide pigments which contain various elemental activators, co-activators and compensators have been prepared which absorb at 380-400 nm and have an emission spectrum of 450-520 nm. Further examples of sulfide photoluminescent phosphorescent materials that have been developed include CaS:Bi, which emits violet blue light; CaStS:Bi, which emits blue light; ZnS:Cu, which emits green light; and ZnCdS:Cu, which emits yellow or orange light.

The term "persistence" of phosphorescence is generally a measure of the time, after discontinuing irradiation that it takes for phosphorescence of a sample to decrease to the threshold of eye sensitivity. The term "long-persistent phosphor" historically has been used to refer to ZnS:Cu, CaS:Eu, Tm and similar materials which have a persistence time of only 20 to 40 minutes.

Recently, phosphorescent materials that have significantly higher persistence, up to 12-16 hours, have been reported. Such phosphors generally comprise a host matrix that can be alkaline earth aluminates (oxides), an alkaline earth silicate, or an alkaline earth alumino-silicate.

Such high luminous intensity and persistence phosphors can be represented for example, by $MAl_2O_3$ or $MAl_2O_4$ wherein M can comprise a plurality of metals at least one of which is an alkaline earth metal such as calcium, strontium, barium and magnesium. These materials generally deploy Europium as an activator and can additionally also use one or more rare earth materials as co activators. Examples of such high intensity and high persistence phosphors can be found, for example, in U.S. Pat. No. 5,424,006, U.S. Pat. No. 5,885,483, U.S. Pat. No. 6,117,362 and U.S. Pat. No. 6,267,911 B1.

High intensity and high persistence silicates have been reported in U.S. Pat. No. 5,839,718, such as SrBaO.Mg-MO.SiGe:Eu:Ln wherein M is beryllium, zinc or cadmium and Ln is chosen from the group consisting of the rare earth materials, the group 3A elements, scandium, titanium, vanadium, chromium, manganese, yttrium, zirconium, niobium, molybdenum, hafnium, tantalum, tungsten, indium, thallium, phosphorous, arsenic, antimony, bismuth, tin, and lead.

Photoluminescent compositions comprising only phosphorescent materials with emissions in the infrared region have been reported. Such phosphorescent materials consist of doped ZnCdS. These materials have been shown to have observable tail emissions into the visible region and consequently would not have utility for clandestine markings. The reported use of these phosphors has been as a "laminated panel of the infrared phosphor powder" and has not been formulated into a composition containing other materials. As previously mentioned, ZnS based phosphors have afterglow characteristics significantly inferior to aluminate photoluminescent pigments, particularly alkaline earth aluminate oxides. It is not surprising therefore that such materials or the laminated panels made therefrom have neither been used for clandestine detection or for detection applications wherein activation and detection can be decoupled spatially and temporally.

Photoluminescent compositions which contain combinations of ZnS phosphorescent materials and fluorescent materials have also been disclosed. However the use of these fluorescent materials has been limited to either altering the charging (activating) radiation or altering the visible daylight or emission color. Since the absorbance spectrum of ZnS phosphorescent materials are primarily in the long UV and blue regions of the electromagnetic spectrum, attaining reasonable afterglow requires downshifting some of the incident natural radiation with fluorescent materials. Use of ZnS with fluorescent materials is generally limited to altering the color observed in daylight. Furthermore the fluorescent materials described exist as aggregates, that is, they are not molecularly dispersed in the polymer resin, consequently resulting in low emission efficiencies.

Photoluminescent compositions have also been contemplated which contain a series of fluorescent materials. One of the fluorescent materials absorbs and emits radiation which is then absorbed by a companion fluorescent material which then emits radiation to give a final infrared emission. As can be appreciated, use of fluorescent materials does not provide for any continued emission once the absorbable radiation is removed. These compositions have no provision for continued emission of infrared radiation that can be detected at a future time, that is, after activation has ceased. The need for activating the materials immediately prior to detection will also require possession of activating equipment at site of detection thereby limiting flexibility and/or portability and thus will not permit stealth detection.

It can be seen then that prior efforts to develop photoluminescent compositions and particularly photoluminescent compositing containing both phosphorescent and fluorescent materials have been directed primarily at emissions in the visible region. Attention has not been given to photoluminescent compositions comprising both phosphorescent and fluorescent materials with emissions in the infrared region of the electromagnetic spectrum. Thus there is a need for photoluminescent compositions wherein emissions, partly or fully in the infrared region, continue after activation has ceased, that is, activation and detection are separated temporally. There is also a need for activation and detection to be separated spatially, that is, activation is not required at the time of detection, so that activating equipment is not required to be carried and be present at the time of detection. Development of photoluminescent compositions whose emissions are partly or fully in the infrared region and which are also of high intensity and persistence, will enable a high degree of spatial and temporal decoupling, that is, detection can occur at great distances from the object and also long after activation has ceased.

Although methods for uniquely marking and identifying objects have received thought and attention, such methods do not enable stealth detection. In many cases, such as, for example, identification of friendly forces in the combat theater, the identifying markings need to be unobservable by enemy personnel, or for example, in anti-counterfeit applications wherein, the identifying markings need to be hidden to avoid detectability of such markings by counterfeiters. Clandestine or stealth identification, wherein the emissions from the photoluminescent markings are not ordinarily observable by a human observer (without specific detection equipment), but detectable by friendly forces, and further wherein activation is not required during detection (such activation being potentially detectable by others), will be of high value in the combat theater for stealth detection of combat equipment, or personnel. Such markings will also be of value for stealth combat operations, or for covertly marking enemy targets for tracking or elimination.

An authentication and identification method based upon marking-up groups of microsized particles normally visible to the naked eye with each particle in each group being of selected uniform size, shape, and color has been proposed. Identification is established by transferring a population of particles from a selected number of the groups to the item to be identified, and then confirming by examining the marked item under high magnification which requires the magnifying device to be in close proximity to the item. It can be readily seen that such methods will have limitations in that one has to be in close proximity to the object to enable detection.

Another method includes incorporating into a carrier composition a mixture of at least two photochromic compounds that have different absorption maxima in the visible region of the electromagnetic spectrum. Authentication or identification requires activating the photochromic compounds immediately prior to detection and subsequently examining the display data. Such activation prior to detection does not allow for temporal decoupling, that is, an object can not be activated, moved and detected at a later time, nor can it be detected in a dark environment.

Other systems have been disclosed wherein items are marked with ink comprised of two or more fluorescent materials wherein the emission from one fluorescent dye is absorbed and reemitted by a second fluorescent dye and so forth in a daisy chain mechanism. The subsequent emissions can be down-shifted to the infrared region. As can be appreciated, a fundamental characteristic of fluorescent materials is that the emission immediately ends when the source of charging is removed. Thus authentication comprises activating or exciting the materials immediately prior to detection with an ultraviolet source, and then rapidly detecting the subsequent emission. When the activation source is removed identification ceases. Consequently activation and detection cannot be decoupled temporally. Thus, these detection methods will not enable stealth identification. Additionally, the activating equipment will have to be present at the time of detection and hence such methods will not allow for flexibility and portability during detection.

As can be seen from the above discussion, there is a need for photoluminescent compositions which emit partly or fully in the infrared region of the electromagnetic spectrum useful for identification and detection of objects. Furthermore there is also a need for photoluminescent materials that enable the act of detection of the object to be decoupled spatially from the object and/or its activation source, that is, detection can occur away from the object and/or its activation source, and also wherein, detection can be decoupled temporally from activation, that is, detection can occur at a time later than the activation. It should be noted that decoupling of activation and detection also allows for flexibility and portability in the act of detection, allowing for clandestine or stealth identification.

It can be appreciated that for optimal luminescent performance, specific photoluminescent phosphorescent materials and mixtures of such materials need to be adapted for use in varying conditions, be it excitation conditions or environmental considerations. Water-resistant formulations suitable for protecting the photoluminescent ingredients, and compositions that minimize photolytic degradation are sought-after. Beyond the selection of the photoluminescent materials it should be noted that the emission intensity and/or persistence from a photoluminescent composition is greatly affected by both the way in which the photoluminescent phosphorescent material is distributed and the additives used, as well as the manner in which that composition is applied.

The improper selection and use of composition materials, such as resins, dispersants, wetting agents, thickeners, and the like can diminish the emission intensity emanating from the composition. This can occur, for example, due to agglomeration or settling of photoluminescent phosphorescent ingredients, either during handling of the formulated materials or after application of the formulated materials. The reduction in emission intensity and/or persistence can result from both incomplete excitations and/or due to scattering of emitted radiation. The scattering of photoluminescent emissions can be either due to agglomeration of photoluminescent phosphorescent material or as a consequence of electromagnetic radiation scattering by one or more of the additives selected to stabilize the photoluminescent phosphorescent pigment dispersion. The net result will be lower emission intensity and/or persistence.

In general, the use of colorants in the form of pigments that are absorptive of visible electromagnetic radiation to impart daylight color to photoluminescent compositions, even when such colorants are not absorptive of photoluminescence, can result in degradation of photoluminescent intensity and/or persistence by virtue of either scattering of the photoluminescence or by inadequate charging of photoluminescent phosphorescent materials. Hence, while absorptive colorants can be used to alter both the daytime appearance of photoluminescent objects and the nighttime emission, such usage will result in a lowering of emission intensity and/or persistence. This is why a majority of compositions whose daylight color has been altered are rated for low intensity and/or persistence. Further, such usage also precludes the achievement of daytime colors and nighttime emissions being in the same family of colors. Identification, whether clandestine or not can also result from markings that have been rendered as stealth markings, that is, the daylight color of the photoluminescent markings can be formulated in such a manner that the markings blend in with the area surrounding the marking so as not to be distinguishable from the surrounding area.

Photoluminescent phosphorescent compositions utilizing various additives to allow dispersion, anti-settling and other compositional properties have been disclosed. These additives include alkyd resins and modified castor oil for rheology modification, synthetic cellulosic resin binders and silica-based powders used as suspending fillers, absorptive pigments as colorants for imparting daytime color, "crystalline fillers", and secondary pigment particles. Compositions containing any of these additives, generally in a solid particulate state, by virtue of scattering phenomenon, can result in lower intensity and/or persistence of emissions from objects deploying them, as has been mentioned above.

It can therefore be seen from the above discussions that there is a need for stable photoluminescent compositions whose emission intensity is high and persistent, and whose emission is partly or fully in the infrared region of the electromagnetic spectrum, such emissions being suitable for methods of clandestine or stealth identification or otherwise identification or detection of objects, such methods designed to decouple activation and detection both spatially, e.g., at a distance away from the object to be detected and/or the activation device, and temporally, e.g., detection at a time later than the activation. In addition there is a need for portability of the detector used in identification or detection processes. Furthermore there is also a need for stealth markings wherein the marking is indistinguishable from its surroundings.

SUMMARY OF THE INVENTION

The present invention provides for photoluminescent compositions containing photoluminescent phosphorescent materials and photoluminescent fluorescent materials whose emission signature lies partly or fully in the infrared region of the electromagnetic spectrum. As well, the invention provides for photoluminescent compositions containing photoluminescent phosphorescent materials and photoluminescent fluorescent materials whose emission signature lies partly or fully in the infrared region of the electromagnetic spectrum which are high in intensity and high in persistence.

A key advantage of these photoluminescent compositions, such as those described below, is that they can be activated or excited without requiring specialized sources. That is, objects containing the photoluminescent compositions can be charged with naturally-occurring illumination essentially for most of the day, be it during the morning, noon, or evening, as well as on cloudy days. The present invention therefore eliminates the need for activating equipment at the point of identification or detection. Further, with the use of high emission intensity and persistent photoluminescent compositions, such as those described below, methods of identifying or detecting objects can be practiced also at nighttime, that is, long after activation has ceased, and at great distances.

In a first aspect, the present invention provides for photoluminescent compositions containing an effective amount of one or more photoluminescent phosphorescent materials and one or more photoluminescent fluorescent materials wherein the one or more photoluminescent phosphorescent materials selectively absorbs and emits electromagnetic energies when activated by electromagnetic radiation either from an excitation source incident upon the composition, or by emissions from a photoluminescent material, or both, and wherein the one or more photoluminescent fluorescent materials selectively absorbs the emission from one or more of the photoluminescent materials and emits electromagnetic energy to give a selected emission signature, such that some or all of the emission signature lies in the infrared portion of the electromagnetic spectrum, the photoluminescent materials being selected so that the emission of one of the photoluminescent materials overlaps with the absorbance of another of the photoluminescent materials, wherein the selected emission signature is the emission from one or more of the selected photoluminescent fluorescent materials, such emission being essentially unabsorbed by any of the other photoluminescent materials.

In a second aspect, the present invention provides for photoluminescent compositions containing an effective amount of one or more photoluminescent phosphorescent materials and one or more photoluminescent fluorescent materials wherein the one or more photoluminescent phosphorescent materials selectively absorbs and emits electromagnetic energies when activated by electromagnetic radiation either from an excitation source incident upon the composition, or by emissions from a photoluminescent material, or both, and wherein the one or more photoluminescent fluorescent materials selectively absorbs the emission from one or more of the photoluminescent materials and emits electromagnetic energy to give a selected emission signature, such that some or all of the emission signature lies in the infrared portion of the electromagnetic spectrum, the photoluminescent materials being selected so that the emission of one of the photoluminescent materials overlaps with the absorbance of another of the photoluminescent materials, wherein the selected emission signature is the emission from one or more of the selected photoluminescent fluorescent materials, such emission being essentially unabsorbed by any of the other photoluminescent materials, and further wherein the photoluminescent phosphorescent materials are selected such that the emission signature has high persistence and high intensity.

In a third aspect, the present invention provides for photoluminescent compositions wherein charging of the object and detection of the emission signature are decoupled spatially and temporally.

DETAILED DESCRIPTION OF THE INVENTION

Figure 1:
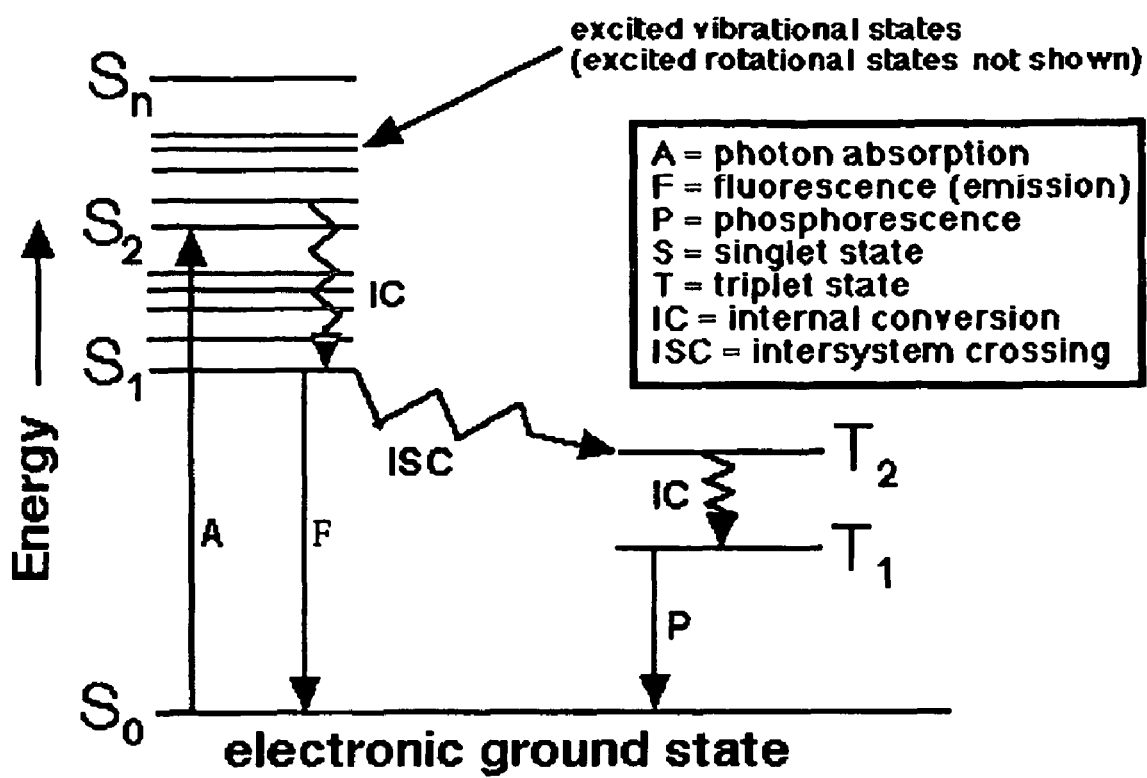
FIG. 1 is a Jablonski Diagram illustrating processes that occur between the absorption and emission of electromagnetic radiation. Step A is the absorption of a photon of electromagnetic radiation in which an electron in the absorbing material is excited from a ground state to an excited energy state. Depending on the excited state reached the electron can degenerate by IC or radiation-less internal conversion to S1 which is the first vibrational excited state. The electron may then return to the ground state with a subsequent release of electromagnetic radiation F. This process is called fluorescence. Some materials will be excited into the excited state and their electrons will undergo Intersystem Crossing, ISC, and reside in a T1 or T2 state. These states are meta-stable in that the electron can remain in the T1 or T2 states for long periods of time. When the electron releases energy and falls back to the ground state by releasing electromagnetic radiation the process is called phosphorescence, P. In some cases the T1 or T2 state is very stable with little to no emission occurring. In this case a stimulating energy is required to cause a release of electromagnetic radiation with the electron falling back to the ground state.
Figure 2:
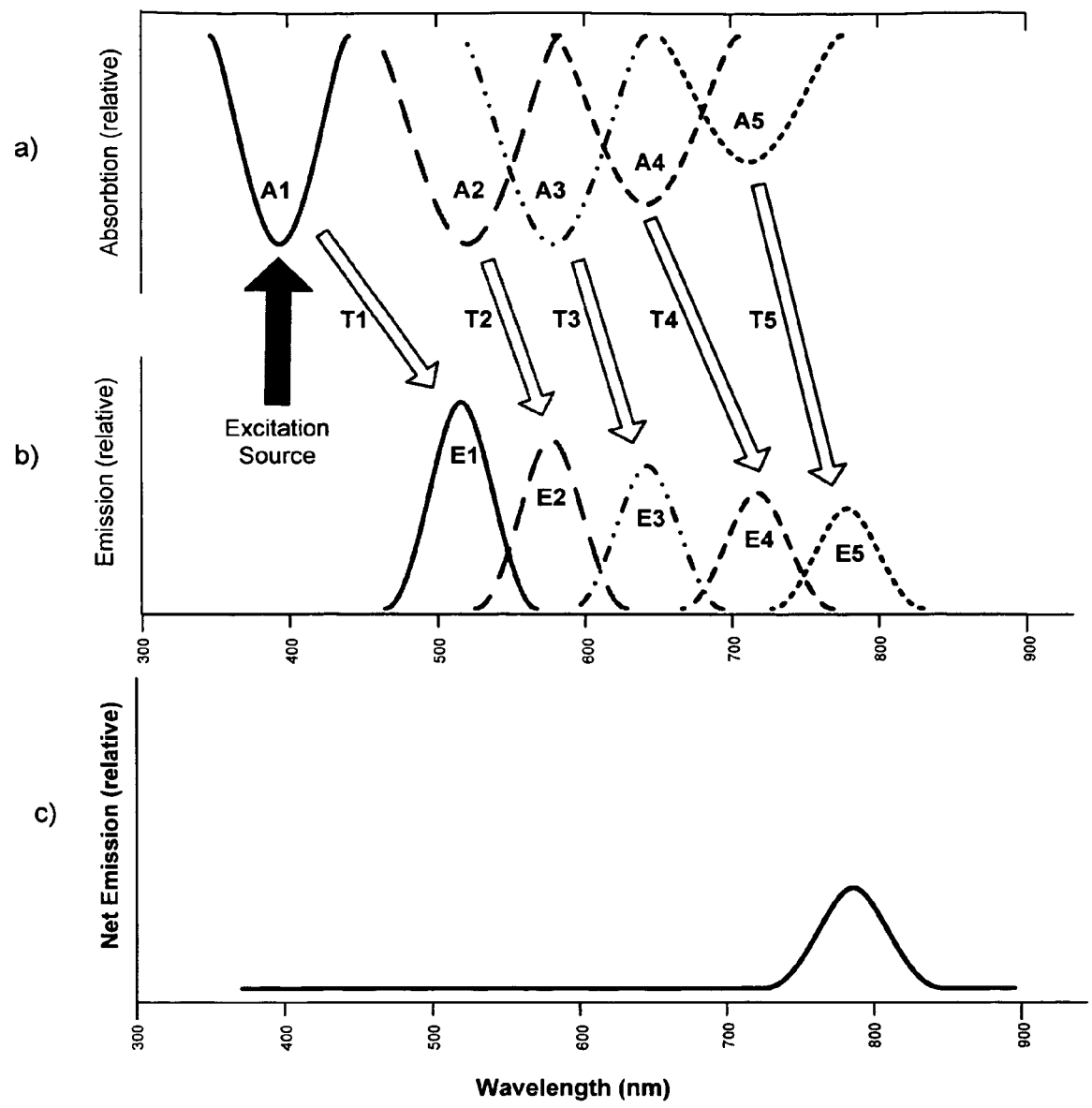
FIG. 2 illustrates a shift in emission spectra resulting from incorporation of photoluminescent phosphorescent and photoluminescent fluorescent dyes. Chart a) is the representative absorbance spectra, b) is the representative emission spectra and c) is the representative net emission spectra resulting from the inventive composition. As illustrated a photoluminescent phosphorescent material absorbs radiation at A1 from an excitation source. The photoluminescent phosphor can continuously emit radiation E1 which overlaps with the absorption spectra A2 which emits radiation at E2. E2 again is designed to overlap with the absorption A3 which emits radiation E3. This process can continue until a final desired emission is obtained, in this case E5. As can be seen from chart c) the composition is designed to emit radiation at approx. 780 nm.
Figure 3:
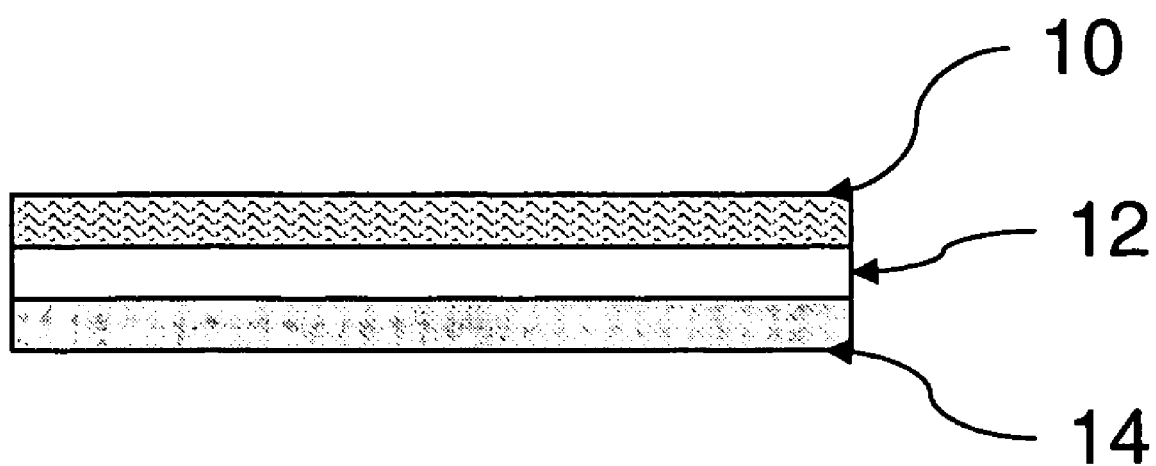
FIG. 3 illustrates an object (14) upon which has been coated a first photoluminescent layer (12) such first photoluminescent layer comprising photoluminescent phosphorescent, or a photoluminescent phosphorescent and photoluminescent fluorescent compositions, and further coated with a second photoluminescent layer (10) such second layer comprising selected photoluminescent fluorescent materials. It may be noted that the second photoluminescent layer may also serve the purpose of a protective layer, that is, affording durability to the first photoluminescent layer.

It has been found that photoluminescent compositions comprising photoluminescent phosphorescent and photoluminescent fluorescent materials, which when applied onto or into objects, permit identification or detection of the objects. A key advantage of the use of the photoluminescent phosphorescent materials is that they can be activated or excited without requiring specialized sources. That is, they can be charged with naturally-occurring illumination essentially for most of the day, be it during the morning, noon, or evening, as well as on cloudy days in addition to artificial sources such as metal halide lamps. Whether activated by naturally or artificially occurring illumination the present invention eliminates the need for having activating equipment at the point of identification or detection and enables detection to be practiced at daytime or nighttime and at locations away from the object and/or its detection source as well as after the activation of the object has ceased. Further, with the use of high luminous intensity and persistent photoluminescent phosphorescent compositions, such as those described below, object identification or detection at daytime or nighttime can be practiced at great distances from the object and/or its activation source and long after activation has ceased.

Unless otherwise noted, percentages used herein are expressed as weight percent.

As used herein, a "luminescent" material is a material capable of emitting electromagnetic radiation after being excited into an excited state.

As used herein, a "photoluminescent composition" is defined as an admixture of materials which is capable of emitting electromagnetic radiation from electronically-excited states when excited or charged or activated by electromagnetic radiation.

As used herein, a "fluorescent" material is a material that has the ability to be excited by electromagnetic radiation into an excited state and which releases energy in the form of electromagnetic radiation rapidly, after excitation. Emissions from fluorescent materials have no persistence, that is, emission essentially ceases after an excitation source is removed. The released energy may be in the form of UV, visible or infrared radiation.

As used herein, a "phosphorescent" material is a material that has the ability to be excited by electromagnetic radiation into an excited state, but the stored energy is released gradually. Emissions from phosphorescent materials have persistence, that is, emissions from such materials can last for seconds, minutes or even hours after the excitation source is removed. The released energy may be in the form of UV, visible or infrared radiation.

"Luminescence", "phosphorescence" or "fluorescence" is the actual release of electromagnetic radiation from a luminescent, phosphorescent or fluorescent material, respectively.

As used herein "Luminous Intensity" is defined as a measure of emitted electromagnetic radiation as perceived by a "standard observer" (see e.g. C. J. Bartelson and F. Grum, *Optical Radiation Measurements, Volume 5—Visual Measurements* (1984), incorporated herein by reference) as mimicked by a photoptic detector, such as an IL 1700 Radiometer/Photometer with high gain luminance detector by International Light Co of Massachusetts.

As used herein "emission intensity" is defined as a measure of the photoluminescent emissions from a photoluminescent object, such measurement being made with any device capable of measuring the emission strength either photometrically or radiometrically, such emissions being either visible or infrared or both.

As used herein "persistence" is defined as the time it takes, after discontinuing irradiation, for photoluminescent emissions emanating from a photoluminescent object to decrease to the threshold detectability with a suitable detection apparatus.

As used herein "high persistence" is defined to mean that the time it takes, after discontinuing irradiation, for photoluminescent emissions emanating from a photoluminescent object to decrease to the threshold detectability with a suitable detection apparatus is greater than five hours.

As used herein, "electromagnetic radiation" refers to a form of energy containing both electric and magnetic wave components which includes ultraviolet (UV), visible and infrared (IR) radiation.

As used herein, an "emission signature" refers to the specific emission spectrum of the photoluminescent composition as a result of activation, such emission being characterizable by wavelength and amplitude.

As used herein "radiation incident upon the photoluminescent composition" refers to the activating or charging electromagnetic radiation wherein at least some of the incident electromagnetic radiation will initially excite one or more of the photoluminescent materials.

As used herein, "Stokes shift" refers to the difference in wavelength between the excitation or activation wavelength and the emission wavelength of photoluminescent materials.

As used herein, a "liquid carrier medium" is a liquid that acts as a carrier for materials distributed in a solid state and/or dissolved therein.

As used herein, a "stabilizing additive" is a material added to a composition so as to uniformly distribute materials present as particulates, to prevent agglomeration, and/or prevent settling of solid material in a liquid carrier medium. Such stabilizing additives generally comprise dispersants, and/or rheology modifiers.

As used herein, "rheology modifiers" are those substances which generally can build viscosity in liquid dispersion compositions, that is, compositions containing particulate matter distributed in a liquid carrier, thereby retarding settling of such particulate materials, while at the same time significantly lowering viscosity upon application of shear, to enhance smooth applicability of such compositions onto objects.

As used herein, "dispersing agents" are those substances which are used to maintain dispersed particles in suspension in a composition in order to retard settling and agglomeration.

As used herein, "photostabilizers" refers to components of the composition designed to retard deterioration, degradation or undesirable changes in compositional and/or visual properties as a result of actions by electromagnetic radiation.

As used herein, a "layer" is a film resulting from a composition containing at least one film-forming polymeric resin that is substantially dry as characterized by the residual liquid carrier medium being in the range of 0-5 weight % of the total weight of the film.

As used herein "clandestine or stealth identification" refers to the act of identifying or detecting an object, wherein the emissions from the photoluminescent markings used for such identification or detection are ordinarily not visible to a human observer either during daytime or nighttime and wherein the emissions from such photoluminescent markings require specific detection equipment for observation for the purpose of identification or detection, and further wherein, activation or charging is not required during detection.

As used herein "stealth marking" refers to a photoluminescent marking whose daylight color has been formulated so as not to be distinguishable from the surrounding area.

As used herein "spatially and temporally decoupled" means that detection can be practiced after the activation has ceased (temporally) as well as detection can occur away from the object and/or its activation source (spatially).

As used herein "CAS #" is a unique numerical identifier assigned to every chemical compound, polymer, biological sequences, mixtures and alloys registered in the Chemical Abstracts Service (CAS), a division of the American Chemical Society.

Not to be held to theory, it is believed that, the selected photoluminescent phosphorescent materials absorb incident activating electromagnetic radiation, for example, ultraviolet and/or visible portions of the electromagnetic spectrum, and an electron is excited from a ground state into an excited state. The excited state electron of a phosphorescent material undergoes a conversion called intersystem crossing wherein the electron is trapped in the excited state and only slowly returns to the ground state with a subsequent emission of electromagnetic radiation, for example, in the visible region of the electromagnetic spectrum. The time for emission to occur from the excited state of phosphorescent materials can be on the order of $10^{-3}$ seconds to hours and even days. In this manner emission radiation from excited phosphorescent materials can continue long after the incident radiation has ceased.

The energy of the emission radiation from a photoluminescent material is generally of lower energy than the energy of the incident activating radiation. This difference in energy is called a "Stokes shift".

Suitable phosphorescent materials are the well known metal sulfide phosphors such as ZnCdS:Cu:Al, ZnCdS:Ag:Al, ZnS:Ag:Al, ZnS:Cu:Al as described in U.S. Pat. No. 3,595,804 and metal sulfides that are co-activated with rare earth elements such as those describe in U.S. Pat. No. 3,957,678. Phosphors that are higher in luminous intensity and longer in luminous persistence than the metal sulfide pigments that are suitable for the present invention include compositions comprising a host material that is generally an alkaline earth aluminate, or an alkaline earth silicate. The host materials generally comprise Europium as an activator and often comprise one or more co-activators such as elements of the Lanthanide series (e.g. lanthanum, cerium, praseodymium, neodymium, samarium, gadolinium, terbium, dysprosium, holmium, erbium, thulium, ytterbium, and lutetium), tin, manganese, yttrium, or bismuth. Examples of such photoluminescent phosphors are described in U.S. Pat. No. 5,424,006.

High emission intensity and persistence phosphorescent materials can be alkaline earth aluminate oxides having the formula MO. $mAl_2O_3$:$Eu^{2+}$, $R^{3+}$ wherein m is a number ranging from 1.6 to about 2.2, M is an alkaline earth metal (strontium, calcium or barium), Eu is an activator, and R is one or more trivalent rare earth materials of the lanthanide series (e.g. lanthanum, cerium, praseodymium, neodymium, samarium, gadolinium, terbium, dysprosium, holmium, erbium, thulium, ytterbium, lutetium), yttrium or bismuth co-activators. Examples of such phosphors are described in U.S. Pat. No. 6,117,362.

High emission intensity and persistence phosphors can also be alkaline earth aluminate oxides having the formula $M_k Al_2O_4$:$2xEu^{2+}$, $2yR^{3+}$ wherein k=1−2x−2y, x is a number ranging from about 0.0001 to about 0.05, y is a number ranging from about x to 3x, M is an alkaline earth metal (strontium, calcium or barium), $Eu^{2+}$ is an activator, and R is one or more trivalent rare earth materials (e.g. lanthanum, cerium, praseodymium, neodymium, samarium, gadolinium, terbium, dysprosium, holmium, erbium, thulium, ytterbium, lutetium), yttrium or bismuth co-activators. Examples of such phosphors are described in U.S. Pat. No. 6,267,911B1.

Phosphors that can be used in this invention also include those in which a portion of the $Al^{3+}$ in the host matrix is replaced with divalent ions such as $Mg^{2+}$ or $Zn^{2+}$ and those in which the alkaline earth metal ion ($M^{2+}$) is replaced with a monovalent alkali metal ion such as $Li^+$, $Na^+$ $K^+$, $Cs^+$ or $Rb^+$. Examples of such phosphors are described in U.S. Pat. No. 6,117,362. & U.S. Pat. No. 6,267,911B1.

High intensity and high persistence silicates can be used in this invention such as has been reported in U.S. Pat. No. 5,839,718, such as Sr.BaO.Mg.MO.SiGe:Eu:Ln wherein M is beryllium, zinc or cadmium and Ln is chosen from the group consisting of the rare earth materials, the group 3A elements, scandium, titanium, vanadium, chromium, manganese, yttrium, zirconium, niobium, molybdenum, hafnium, tantalum, tungsten, indium, thallium, phosphorous, arsenic, antimony, bismuth, tin, and lead. Particularly useful are dysprosium, neodymium, thulium, tin, indium, and bismuth. X in these compounds is at least one halide atom.

Other phosphorescent materials suitable for this invention are alkaline earth aluminates of the formula $MO.Al_2O_3.B_2O_3$:R wherein M is a combination of more than one alkaline earth metal (strontium, calcium or barium or combinations thereof) and R is a combination of $Eu^{2+}$ activator, and at least one trivalent rare earth material co-activator, (e.g. lanthanum, cerium, praseodymium, neodymium, samarium, gadolinium, terbium, dysprosium, holmium, erbium, thulium, ytterbium, lutetium), bismuth or manganese. Examples of such phosphors can be found in U.S. Pat. No. 5,885,483.

Alkaline earth aluminates of the type $MAl_2O_4$, which are described in U.S. Pat. No. 5,424,006, are also suitable for this invention.

Phosphors that can be used in this invention also include phosphors comprising a donor system and an acceptor system such as described in U.S. Pat. No. 6,953,536 B2.

Phosphorescent materials described above generally absorb in the UV or near UV/Visible regions of the electromagnetic spectrum with subsequent emissions from 390-700 nm.

As can be appreciated, many other phosphors are useful to the present invention. Such useful phosphors are described in Yen and Weber, *Inorganic phosphors: compositions, preparation and optical properties*, CRC Press, 2004.

Not to be held to theory the selected photoluminescent fluorescent materials absorb incident activating electromagnetic radiation, for example, ultraviolet, visible and/or infrared portions of the electromagnetic spectrum and an electron is excited from a ground state into an excited state. In the case of such photoluminescent fluorescent materials the electron returns rapidly to the ground state with subsequent release of electromagnetic radiation, for example, ultraviolet, visible and/or infrared radiation. The time for emission to occur from the excited state in photoluminescent fluorescent materials can be on the order of $10^{-8}$ seconds. Continued emission from photoluminescent fluorescent materials ceases when the activating energy ceases. The energy of the emission is generally lower than the energy of the incident activating radiation.

Selected photoluminescent fluorescent materials useful in the current invention include photoluminescent fluorescent materials that absorb in the visible and/or infrared and emit in the visible and/or infrared. For example, photoluminescent fluorescent materials that absorb in the visible and emit in the visible include, for example, coumarins such as coumarin 4, coumarin 6, and coumarin 337; rhodamines such as rhodamine 6G, rhodamine B, rhodamine 101, rhodamine 19, rhodamine 110, and sulfarhodamine B; phenoxazones including Nile red and cresyl violet; styryls; carbostyryls; stilbenes; and fluorescenes. Examples of photoluminescent fluorescent materials that absorb in the visible region of the electromagnetic spectrum and emit in the far visible and infrared regions include, for example, Nile Blue, IR 140 (CAS# 53655-17-7), IR 125 (CAS# 3599-32-4), and DTTCI (CAS# 3071-70-3). Below in Table 1 are the absorption and emission characteristics of some of the photoluminescent fluorescent materials suitable for the current invention.

TABLE 1

| Fluorescent | CAS # | Max. Absorbance (nm) | Max. Emission (nm) |
|---|---|---|---|
| Coumarin 6 | 38215-35-0 | 458 | 505 |
| Rhodamine 110 | 13558-31-1 | 510 | 535 |
| Rhodamine 19P | 62669-66-3 | 528 | 565 |
| Rhodamine 6G | 989-38-8 | 530 | 556 |
| Nile red | 7385-67-3 | 550 | 650 |
| Nile blue | 53340-16-2 | 633 | 672 |
| IR 676 | 56289-64-6 | 676 | 720 |

IR-676 is 1,1',3,3,3',3'-Hexamethyl-4,5,4',5'-dibenzoindodicarbocyanine

When photoluminescent phosphorescent materials are admixed with selected photoluminescent fluorescent materials, the emission of the photoluminescent phosphorescent materials can be absorbed by the photoluminescent fluorescent materials with subsequent emission which exhibit a downward Stokes shift to an energy lower than the energy used to excite the photoluminescent phosphor. The emission energy from the photoluminescent fluorescent material can be absorbed by a second photoluminescent fluorescent material selected for its ability to absorb such radiation. The second photoluminescent fluorescent material will exhibit a downward Stokes shift to an energy lower than the energy emitted from the first photoluminescent fluorescent material. Additional photoluminescent fluorescent materials can be chosen to further exhibit Stokes shifts until a selected emission is achieved. The selected emission can be chosen to be partially or fully in the infrared regions of the electromagnetic spectrum. Generally, a Stokes shift for a single photoluminescent phosphorescent or photoluminescent fluorescent material ranges from 20 to 100 nm. In order to produce longer Stokes shifts, multiple photoluminescent fluorescent materials can be used to produce a cascading Stokes shift. A cascading Stokes shift is produced by successive absorptions of the emission of one of the photoluminescent materials by another of the photoluminescent fluorescent materials and re-emission at a longer wavelength. When done multiple times Stokes shifts significantly in excess of 50 nm can be created.

The quantum efficiency of compositions comprising photoluminescent phosphorescent and/or photoluminescent fluorescent materials will be dependent on a number of factors, such as degree of overlap between the emission spectrum of one of the photoluminescent materials with the absorption spectrum of another of the photoluminescent materials and the degree to which the photoluminescent fluorescent materials are molecularly dispersed in the polymer comprising the binding matrix. In order for the photoluminescent fluorescent materials to be molecularly dispersed in the polymer or exist as a solid state solution in the chosen polymer or polymers, it is essential for the photoluminescent fluorescent materials to be in solution in the liquid carrier medium and be compatible with the chosen polymers.

Selected admixing of photoluminescent phosphorescent materials with photoluminescent fluorescent materials will result in compositions that can be charged or activated by incident electromagnetic energy, for example, by ultraviolet, visible, or combinations thereof, and emit partially or fully in the infrared. Since the activated photoluminescent phosphorescent material will continue to emit radiation long after the activating radiation has been removed, the photoluminescent composition will continue to emit radiation partially or fully in the infrared region of the electromagnetic spectrum.

It can readily be seen that activation of the inventive compositions and detection of their subsequent emission can occur at separate times and at separate places. Thus, the compositions can be applied to an object and charged with electromagnetic radiation. The radiation can be shut off and the object can be moved to a different place while the emissions continue to occur enabling detection to occur long after activation has ceased.

Selected photoluminescent fluorescent materials can additionally be incorporated into the photoluminescent compositions containing the above described photoluminescent phosphorescent and photoluminescent fluorescent materials to optimally couple the excitation source and the absorbance spectrum of a selected photoluminescent material that is to be initially activated from an external electromagnetic radiation source.

The photoluminescent fluorescent materials of the current invention that exhibit this property can be admixed into the photoluminescent composition containing the phosphorescent materials or they can reside in a coating either above or below such photoluminescent composition, or both.

It has also been found that photoluminescent compositions comprising an effective amount of one or more photoluminescent phosphorescent materials, one or more photoluminescent fluorescent materials, one or more liquid carriers, one or more polymeric binders, one or more photostabilizers, one or more rheology modifiers, and one or more dispersing agents can be selected to give an emission signature which is totally or partially in the infrared region of the electromagnetic spectrum. It has been further found that with selection of certain alkaline earth phosphorescent materials, referred to above, the emission signature can have high intensity and persistence For optimal performance of luminescent materials for high intensity and persistence, specific photoluminescent materials and mixtures of such materials need to be adapted for use in varying conditions, for example, excitation conditions or environmental considerations. Water-resistant compositions suitable for protecting the photoluminescent phosphorescent particles and compositions that minimize photolytic degradation are sought-after. Beyond the selection of the photoluminescent phosphorescent materials and/or any additional photoluminescent fluorescent materials used to enhance their performance, it should be noted that the emission intensity and/or persistence from a photoluminescent composition is greatly affected by both the way in which the photoluminescent phosphorescent materials are distributed and the additives used, as well as the manner in which that composition is applied.

The improper selection and use of the composition materials, such as binders, dispersing agents, wetting agents, rheology modifiers, photostabilizers, and the like can diminish the emission intensity emanating from the composition. This can occur, for example, due to agglomeration or settling of photoluminescent phosphorescent particles, either during handling of the formulated materials or after application of the formulated materials. The reduction in emission intensity and/or persistence can result from incomplete excitations and/or scattering of emitted radiation. The scattering of photoluminescent emissions can be either due to agglomeration of photoluminescent phosphorescent material or as a consequence of electromagnetic radiation scattering by one or more of the additives selected to stabilize the photoluminescent phosphorescent pigment dispersion. The net result will be lower emission intensity and persistence.

The use of colorants in the form of pigments that are absorptive of visible electromagnetic radiation, in order to impart daylight color to photoluminescent compositions, even when such pigments are not absorptive of photoluminescent emissions, can result in degradation of photoluminescent intensity and persistence by virtue of either scattering of photoluminescent emissions or by inadequate charging of photoluminescent phosphorescent materials. Hence, for attaining maximum emission intensity, use of absorptive pigments should be avoided. It should be noted however that creation of stealth markings can be aided by the selective use of absorptive pigments designed to adjust the daylight color of the markings so that a photoluminescent marking will blend in with the surrounding areas. By keeping the amount of pigment used low, one can minimize any negative impact on the emission intensity and persistence of the emission signature.

As mentioned earlier, for stealth identification the emission is not ordinarily observable by a human observer. It should be noted, however, that there is a wide range of capability in humans for the detection of visible radiation. Hence, for highly sensitive applications, wherein it is desirable that there be no circumstance wherein even a human observer with acute vision cannot detect any emission, even after long adaptation to nighttime conditions, and standing very close to the object with the photoluminescent marking, one can ensure a high degree of stealth detection by incorporating a low level of a visible light absorptive pigment, either in the photoluminescent markings or in a layer above the photoluminescent marking.

The photoluminescent composition of these teachings can also include:
  a. one or more liquid carriers
  b. one or more polymeric binders
  c. one or more rheology modifiers
  d. one or more dispersing agents
wherein the photoluminescent phosphorescent materials are uniformly distributed within the composition and wherein the rheology modifiers and dispersing agents are soluble in the liquid carrier.

It is important to select only those polymeric binder resins for the photoluminescent materials that do not absorb electromagnetic radiation within the excitation spectrum of the chosen photoluminescent material and that are also compatible with the selected photoluminescent materials. This is important, for otherwise, the excitation of the photoluminescent materials will be inhibited. It is also desirable that the chosen polymeric materials should have minimal impact on the emission intensity, that is, it should not exhibit any significant quenching of the photoluminance. Binder resins suitable for the inventive compositions include acrylates, for example NeoCryl® B-818, NeoCryl® B-735, NeoCryl® B-813, and combinations thereof, all of which are solvent soluble acrylic resins available from DSM NeoResins®, polyvinyl chlorides, polyurethanes, polycarbonates, and polyesters, and combinations thereof.

The liquid carrier can be, for example, any solvent which does not adversely impact the photoluminescent materials and which allows for the solubility of the photoluminescent fluorescent materials selected for the photoluminescent composition. In selecting the liquid carrier, for cases wherein the polymer is soluble in the liquid carrier, the polymeric solution should be clear and should not exhibit any haze, otherwise, emission intensity transmission will be adversely impacted. In general, highly polar solvents will increase the likelihood of emission quenching, and hence should, in general, be avoided. Suitable liquid carriers include glycols, glycol ethers, glycol acetates, ketones, hydrocarbons such as toluene and xylene.

Photostabilizers useful in the inventive composition include UV absorbers, singlet oxygen scavengers, antioxidants, and or mixtures, for example, Tinuvin® 292, Tinuvin® 405, Chimassorb® 20202, Tinuvin® 328, or combinations thereof, all from Ciba® Specialty Chemicals.

Suitable rheology modifiers include polymeric urea urethanes and modified ureas, for example, BYK® 410 and BYK® 411 from BYK-Chemie®.

Dispersants suitable for the inventive compositions include acrylic acid-acrylamide polymers, salts of amine functional compounds and acids, hydroxyl functional carboxylic acid esters with pigment affinity groups, and combinations thereof, for example DISPERBYK®-180, DISPERBYK®-181, DISPERBYK®-108, all from BYK-Chemie® and TEGO® Dispers 710 from Degussa GmbH.

Other additives can be incorporated into the inventive compositions, including wetting agents such as polyether siloxane copolymers, for example, TEGO® Wet 270 and non-ionic organic surfactants, for example TEGO® Wet 500, and combinations thereof; and including deaerators and defoamers such as organic modified polysiloxanes, for example, TEGO® Airex 900.

According to the present photoluminescent compositions components can be from about 10%-50% of binder resin, about 15%-50% of liquid carrier, 2%-35% photoluminescent phosphorescent material, 0.5%-5.0% dispersing agent, 0.2%-3.0% rheology modifying agent, 0.1%-3.0% photostabilizer, 0.2%-2.0% de-aerating agent, 0.2%-3.0% wetting agent, and 0.1%-2.0% photoluminescent fluorescent material.

Methods to prepare photoluminescent objects using the present inventive compositions and which emit either wholly or partially in the infra red can encompass a variety of techniques for application of the photoluminescent compositions described above either onto or into objects. For example, techniques wherein the compositions described above can be applied onto objects include coating onto the object. Such coating methods for applying photoluminescent compositions onto objects can include but are not limited to screen printing, painting, spraying, dip coating, slot coating, roller coating, and bar coating. Other techniques wherein the compositions described above can be applied onto objects include printing onto the object. Such printing methods for applying photoluminescent compositions onto objects can include but are not be limited to lithographic printing, ink jet printing, gravure printing, imaged silk screen printing and laser printing as well as manually painting or scribing the object with the photoluminescent compositions described above. Typically the composition is coated and dried so that the resulting layer is physically robust. The objects of the current invention may additionally have applied to them a second composition which contains one or more of the fluorescent materials described above. This second applied composition can also serve as a protective coating for the first photoluminescent application.

Photoluminescent objects that use the current inventive compositions and which emit either wholly or partially in the infra red can also be prepared by incorporating the compositions, described above, into the objects by including the photoluminescent composition in the manufacture of the object. For example for plastic objects that can be prepared by extrusion, any of the compositions described above can be added to the object's composition at from 2 to 30% of the total composition and extruded to give an object which can be identified or detected by the inventive method. Preparation of photoluminescent objects wherein the compositions are included in the manufacture of the object can include a variety of manufacturing techniques such as molding, extrusion, etc. For purposes of identification, detection and authentication, an object need only be partially coated with the photoluminescent composition.

The above described photoluminescent compositions or objects can be charged or activated with electromagnetic radiation, for example, ultraviolet, near ultraviolet or combinations thereof, by a number of convenient methods including metal halide lamps, fluorescent lamps, or any light source containing a sufficient amount of the appropriate visible radiation, UV radiation or both, as well as sunlight, either directly or diffusely, including such times when sunlight is seemingly blocked by clouds. At those times sufficient radiation is present to charge or activate the composition or object. The source of activation can be removed and the object will continue to emit radiation in the selected region and be detected, for example, in darkness when there is no activating radiation.

Since the object will continue to emit the desired radiation, charging of the object and detection of the emission signature are spatially and temporally decoupled, that is, the detection step can occur at a time and place separate from the activation step. This allows an object either to be charged and removed from the site of activation or to be charged with subsequent removal of the charging source. Further, detection can occur at a distance from the object and/or the activating source.

For the purpose of identification or authentication, a detector that will detect the selected emission signature from the photoluminescent object containing the inventive composition is used. Such detectors may or may not have capability of amplifying the photoluminescent emissions. An example of a detection apparatus with amplification is night vision apparatus. Night vision apparatus can detect either visible radiation if present, infrared radiation, or both visible and infrared radiation. The detection apparatus can be designed to detect specific emission signatures. Where necessary, detectors can incorporate amplification capabilities. Either the detector can be designed to read a specific wavelength of the emission signature or the composition can be created to emit radiation suitable for a specific detector. Because of the nature of the inventive methods and compositions, detection can occur at a time and place separate from activation.

Under certain conditions the detection equipment may be adversely impacted by radiation from extraneous sources causing identification or detection of the intended object to be difficult due to the inability of the detector to differentiate between emission signature and such spurious radiation. Under these conditions, the detection equipment, for example, night vision apparatus, may be fitted with a filter designed to eliminate the extraneous visible radiation thereby enhancing identification or detection.

The type of image obtained from the selected emission signature can be in the form of an amorphous object or it can have informational properties in the form of alphabetical, numerical, or alpha-numeric markings as well as symbols, such as geometric shapes and designations. In this manner identification or detection can be topical, either with up-to-date information, such as times and dates, as well as messages.

Identification or detection methods are inclusive of both those methods, wherein the photoluminescent materials, applied either onto or into an object, to create photoluminescent markings which enable the emission signature, may be detectable by a human observer, and those methods wherein such emissions from such photoluminescent markings are stealth to enable "clandestine" or "stealth" detection. When practicing stealth identification, for the case wherein the emission is only partially in the infrared region of the electromagnetic spectrum, the visible emission component is low enough to be undetectable by a human observer. Identification or detection of the stealth markings described above, either on, or in objects, can only be made by using devices designed to detect the selected emission signature.

Identification or detection methods using the current inventive composition and embodying clandestine detection can be deployed for detection or identification of objects, people or animals. Photoluminescent objects onto or into which such photoluminescent markings can be applied include, for example, military objects to designate friend or foe, as well as trail markings. Such markings are designed to be detected only by selected personnel. Examples of the use of markings for stealth detection include airplane or helicopter landing areas, or markings that reveal the presence or absence of friendly forces.

Identification or detection methods using the current inventive composition and embodying both clandestine and non-clandestine markings allow for identification of, for example, stationary combat apparatus, mobile combat apparatus, combat articles of clothing, or combat gear either worn by combatants or carried by combatants, tanks, stationary artillery, mobile artillery, personnel carriers, helicopters, airplanes, ships, submarines, rifles, rocket launchers, semi-automatic weapons, automatic weapons, mines, diving equipment, diving clothing, knap-sacks, helmets, protective gear, parachutes, and water bottles.

Identification or detection methods using the current inventive composition and embodying both stealth and non-stealth markings allow for identification of, for example, stationary combat apparatus, mobile combat apparatus, combat article of clothing, or combat gear either worn by combatants or carried by combatants, tank, stationary artillery, mobile artillery, personnel carriers, helicopters, airplanes, ships, submarines, rifles, rocket launchers, semi-automatic weapons, automatic weapons, mines, diving equipment, diving clothing, knap-sacks, helmets, protective gear, parachutes, and water bottles.

The current compositions allow for markings embodying adhesive layers that can not only provide identification or detection but also up-to-date information, such as, for example, times and dates, messages, and military unit identification, thereby rendering renewable or updatable markings.

The current compositions allow for identification or detection including tracking of transportation vehicles, for example, buses, airplanes, taxi cabs, subway vehicles, automobiles and motorcycles.

Identification or detection methods using the current inventive composition and embodying either stealth or non stealth markings can also be used for applications in sports and entertainment, for example, in hunting and fishing applications which are designed to identify or detect other hunters or fisherman. Stealth markings can be particularly useful in hunting applications wherein accidents can be avoided by using infrared emission detection apparatus for identifying or detecting other hunters but at the same time since no visible emission is detectable, avoiding spooking the hunted animal.

Identification or detection compositions that embody stealth markings may be particularly useful for applications requiring security.

The compositions of the current invention can also be used in anti-counterfeit applications applicable to a wide variety of goods or objects. Photoluminescent objects prepared according to the methods described above can be utilized in anti-counterfeit applications, for example, currency, anti-piracy applications, such as CDs or DVDs, luxury goods, sporting goods etc. In many of these applications it becomes important that the potential counterfeiter be unaware that the object that is being counterfeited contains a marking that will authenticate the object. The clandestine marking can also be coded such as a date code or other identifying code that a counterfeited object would not have.

The current compositions can be applied onto carrier materials, such as films, for example, polyester, polycarbonate, polyethylene, polypropylene, polystyrene, rubber or polyvinyl chloride films, or metallic plates, for example, aluminum, copper, zinc, brass, silver, gold, tin, or bronze plates. Other layers can be added to the carrier material such as an adherent material, for example, an adhesive with high or low peel strength or a magnetic material. The carrier material with the photoluminescent material applied thereon can either be attached permanently to an object or it can be transferable so that identification or detection can be changed, updated or removed. Such application allows for an object to have the identification or detection capabilities of the current invention without the object itself undergoing a coating process. In this application, if information becomes outdated, the carrier material with the photoluminescent material applied thereon in the form of a removable film or plate can be replaced by another carrier material with the photoluminescent material applied thereon with updated information, for example, in safety applications or security applications.

An illustration of a method using the current inventive compositions wherein the photoluminescent object can be created by a photoluminescent transferable film or plate is now described. A suitable carrier sheet, such as, for example, polyethylene terephthalate can be first coated with a release layer, such as, for example, a silicone release layer. A composition can then be applied that comprises one or more fluorescent materials. This layer may also serve as a protective layer. A layer of a photoluminescent composition comprising either phosphorescent materials or phosphorescent and fluorescent materials such as those described above is applied, followed by a reflective layer and an adhesive layer. A coversheet which has release characteristics is then applied. In usage the cover sheet is peeled away and the adhesive layer is applied to an object to be identified or detected. The carrier layer that further comprises a release layer is removed and a photoluminescent object is obtained.

The current compositions allow for creation of photoluminescent objects wherein at least some of the photoluminescent fluorescent materials are incorporated in a second photoluminescent layer either above or below a first photoluminescent layer, such first photoluminescent layer comprising photoluminescent phosphorescent materials or photoluminescent phosphorescent and photoluminescent fluorescent materials with the net emission from the object being either wholly or partially in the infra red. It should be noted that such second photoluminescent layers can also serve as a protective coating for the first photoluminescent layer.

Objects prepared using the current inventive compositions can have low emission intensity by virtue of inadequate reflection of the emitted electromagnetic radiation; either because of surface roughness or because of materials in the object that are absorptive of the selected emission signature. As a result reflective layers or coatings that are reflective of the emissions from the photoluminescent compositions can be used as primers to provide a surface from which the emission signature can reflect. Hence a reflective layer may be first applied either onto a carrier material or onto the object itself followed by one or more photoluminescent layers.

Further, certain usages of these objects in which adverse environmental conditions are present require protection, for example, protection from wet conditions, resistance to mechanical abrasion, and improved robustness. In these applications use of a protective layer can be highly beneficial. A protective top-coat can be applied to the objects that have been prepared by the inventive method. Additionally the protective top-coat can be applied to objects that have a reflective coating as described above. Such protective top coats may also comprise some or all of the photoluminescent fluorescent materials.

EXAMPLES

Example 1

Single Layer Embodiment

Into 54.47 g of ethylene glycol monobutyl ether was admixed 20.35 g of NeoCryl® B-818 (an acrylic resin from DSM NeoResins®) To the admix was added 1.80 g of DisperBYK® 180 (from BYK-Chemie), 0.88 g of TEGO® Wet 270 and 0.57 g of TEGO® Airex 900 (both from Degussa GmbH) with stirring. Then 0.10 g of rhodamine 19P, 0.10 g of dichlorofluorescein, 0.10 g of Nile Blue, 0.10 g of Nile Red, 0.05 g of sulfarhodamine B, 0.01 g of rhodamine 800 and 0.01 g of 3,3'-diethyloxatricarbocyanine iodide were added and mixed. until dissolved. 20.35 g of H-13, green phosphor (from Capricorn Specialty Chemicals) was then added. 1.11 g of BYK® 410 was then added. The photoluminescent composition thus prepared was coated onto a 3"×8" swatch of white Mylar® film using a wire draw down bar, and dried at 50° C. (<5% solvent) for 12 hours to a dried thickness of 10 mils. The coated Mylar® swatch was placed in a RPS 900 emission spectrometer. An emission signature of 720 nm was measured. The coated Mylar® and an uncoated Mylar® swatch were placed 1 foot from a 150 watt metal halide lamp and exposed for 15 minutes. After one hour the swatches were removed to a light-locked room and observed using a Generation 3 proprietary night vision monocular scope from a distance of 5 feet. The coated swatch showed a bright, vivid image while the uncoated swatch was undetectable. The swatches were monitored hourly without further exposure to electromagnetic radiation. After 13 hours the coated swatch continued to persist in emitting radiation that was detectable by the night scope.

Example 2

Two Layer Embodiment

First Layer Composition

Into 17.80 g ethylene glycol monomethyl ether, 13.35 g butyl acetate, 8.90 g ethylene glycol monobutyl ether and 4.45 g ethyl alcohol was admixed 37.92 g of NeoCryl® B-818 (an acrylic resin from DSM NeoResins®). To the admix was added 0.28 g of Tinuvin® 405 (from Ciba Specialty Chemicals), 2.46 g of DisperBYK® 180 (from BYK-Chemie), 1.19 g of TEGO® Wet 270 and 0.78 g of TEGO® Airex 900 (both from Degussa GmbH). Then 0.06 g of rhodamine 19P, 0.03 g of Nile Blue, 0.06 g of Nile Red, 0.06 g of dichlorofluorescein, 0.03 g sulfarhodamine B, 0.01 g of rhodamine 800 and 0.01 g of 3,3'-diethyloxatricarbocyanine iodide were added and mixed until dissolved. 11.1 g of H-13, green phosphor (from Capricorn Specialty Chemicals) and 1.51 g of BYK 410 (from BYK-Chemie) were then added.

Second Layer Composition

Into 61.99 g of ethylene glycol monobutyl ether was admixed 34.44 g of NeoCryl® B-818 (an acrylic resin from DSM NeoResins®). To the admix was added 2.00 g of Tinuvin® 405 (from Ciba Specialty Chemicals), 0.34 g of TEGO® Wet 270 and 1.03 g of TEGO® Airex 900 (both from Degussa GmbH). To the admix was added 0.20 g of rhodamine 110 and mixed until dissolved.

Two Layer Construction

The first layer composition was applied onto a 3"×8" swatch of white Mylar® film using a wire draw down bar, and dried at 50° C. (<5% solvent) for 12 hours to a dried thickness of 10 mils. The second layer composition was then applied onto the first layer using a wire draw down bar and dried at 50° C. (<5% solvent) for 12 hours to a dried thickness of 1 mil.

The two-layered swatch was placed in a RPS 900 emission spectrometer. An emission signature of 730 nm was measured. The swatch was placed 1 foot from a 150 watt metal halide lamp and exposed for 15 minutes. It was taken to a light-locked room where there was no emission observable with the unaided eye even after the eyes adjusted to the dark for 15 min. Using a Generation 3 proprietary night vision monocular scope from a distance of 5 feet, the swatch showed a bright, vivid image. After 13 hours the swatch continued to persist in emitting radiation that was detectable by the night scope.

Example 3

The method described in example 1 was repeated using a polystyrene placard in place of the Mylar® and with the alphanumeric "Danger !!!" written thereon. The placard was placed outside, affixed to a tree at approximately noon. Under nighttime conditions the placard could not be seen. When observed through a pair of night vision, IR sensitive goggles the alphanumeric was prominently displayed and the alphanumeric could be noted.

What is claimed is:

1. A photoluminescent composition comprising an effective amount of:
   (a) One or more photoluminescent phosphorescent materials and,
   (b) One or more photoluminescent fluorescent materials;
   wherein the one or more photoluminescent phosphorescent materials selectively absorbs and emits electromagnetic energies when charged or activated by either electromagnetic radiation from an excitation source incident upon the composition, or by the emissions of another photoluminescent material, or both,
   wherein the one or more photoluminescent fluorescent materials selectively absorbs the emission from the one or more photoluminescent materials and emits the electromagnetic energies to give a selected emission signature, such that some or all of the emission signature lies in the infrared portion of the electromagnetic spectrum, the one or more photoluminescent materials being selected so that the emission of one of the one or more photoluminescent phosphorescent/fluorescent materials overlaps with the absorbance of another of the one or more photoluminescent fluorescent/phosphorescent materials, and
   wherein the selected emission signature is the emission from one or more of the selected photoluminescent fluorescent materials, such emission being essentially unabsorbed by any of the other photoluminescent materials.

2. The composition of claim 1, wherein at least one of said one or more of photoluminescent fluorescent/phosphorescent materials is selected to optimally couple absorbance spectrum of said at least one photoluminescent fluorescent/phosphorescent material and emission spectrum of at least another one of said one or more photoluminescent phosphorescent/fluorescent materials.

3. The composition of claim 1, wherein the photoluminescent fluorescent materials are selected such that the photoluminescent fluorescent materials are soluble in a liquid carrier comprising the photoluminescent formulation.

4. The composition of claim 1, 2 or 3, wherein the radiation from the excitation source is ultraviolet, near ultraviolet or visible radiation or combinations thereof.

5. The composition of claim 4 wherein the excitation source is daylight, fluorescent lamps, metal halide lamps, or other sources with sufficient electromagnetic energy to activate the selected photoluminescent material or materials.

6. The composition of claim 4, wherein the photoluminescent fluorescent materials are selected such that the photoluminescent fluorescent materials are soluble in a liquid carrier comprising the photoluminescent formulation.

7. A photoluminescent composition comprising an effective amount of:
   (a) One or more photoluminescent phosphorescent materials and,
   (b) One or more photoluminescent fluorescent materials;
   wherein the one or more photoluminescent phosphorescent materials selectively absorbs and emits electromagnetic energies when charged or activated by either electromagnetic radiation from an excitation source incident upon the composition, or by the emissions from another photoluminescent material, or both,
   wherein the one or more photoluminescent fluorescent materials selectively absorbs the emission from the one or more photoluminescent materials and emits the electromagnetic energies to give a selected emission signature, such that some or all of the emission signature lies in the infrared portion of the electromagnetic spectrum, the photoluminescent materials being selected so that the emission of one of the photoluminescent phosphorescent/fluorescent materials overlaps with the absorbance of another of the photoluminescent fluorescent/phosphorescent/materials,
   wherein the selected emission signature is the emission from one or more of the selected photoluminescent fluorescent materials, such emission being essentially unabsorbed by any of the other photoluminescent materials, and wherein the photoluminescent phosphorescent materials comprise high afterglow persistence and intensity alkaline-earth aluminates, or alkaline-earth silicates, or combinations thereof, to result in the selected emission signature with high persistence and high intensity.

8. The composition of claim 7, wherein the photoluminescent phosphorescent materials comprise Group IIA metal oxide boro-aluminates activated by europium and at least one other element of the Lanthanide series, yttrium, tin, manganese, or bismuth.

9. The composition of claim 7, wherein at least one of said one or more photoluminescent fluorescent/phosphorescent materials is selected to optimally couple absorbance spectrum of said at least one photoluminescent fluorescent/phosphorescent material and emission spectrum of at least another one of said one or more photoluminescent phosphorescent/fluorescent materials.

10. The composition of claim 7, wherein the photoluminescent fluorescent materials are selected such that the photoluminescent fluorescent materials are soluble in a liquid carrier comprising the photoluminescent formulation.

11. The composition of claim 7, wherein the radiation from the excitation source is ultraviolet, near ultraviolet or visible radiation or combinations thereof.

12. The composition of any one of claims 8, 9, and 10 wherein the radiation from the excitation source is ultraviolet, near ultraviolet or visible radiation, or combinations and wherein the excitation source is daylight, fluorescent lamps, metal halide lamps, or other sources with sufficient electromagnetic energy to activate the selected photoluminescent material or materials.

13. The composition of any one of claims 8, 9 and 11, wherein the photoluminescent fluorescent materials are selected such that the photoluminescent fluorescent materials are soluble in a liquid carrier comprising the photoluminescent formulation.

14. The composition of claim 7, wherein the effective amount of photoluminescent composition further comprises:
(c) one or more liquid carriers;
(d) one or more polymeric binders;
(e) one or more rheology modifiers; and
(f) one or more dispersing agents
wherein the photoluminescent phosphorescent materials are uniformly distributed within the composition and wherein the rheology modifiers and dispersing agents are soluble in the liquid carrier.

15. The composition of claim 14, wherein the photoluminescent phosphorescent materials comprise non radioactive Group IIA metal oxide boro-aluminates activated by europium and at least one other element of the Lanthanide series, yttrium, tin, manganese, or bismuth.

16. The composition of claim 14 wherein the photoluminescent composition does not comprise absorptive colorant pigments.

17. The composition of claim 14, wherein at least one of said one or more photoluminescent fluorescent/phosphorescent materials is selected to optimally couple absorbance spectrum of said at least one photoluminescent fluorescent/phosphorescent material and emission spectrum of at least another one of said one or more photoluminescent phosphorescent/fluorescent materials.

18. The composition of claim 14, wherein the photoluminescent fluorescent materials are selected such that the photoluminescent fluorescent materials are soluble in a liquid carrier comprising the photoluminescent formulation.

19. The composition of claim 14, wherein the radiation from the excitation source is ultraviolet, near ultraviolet or visible radiation or combinations thereof.

20. The composition of any one of claims 15, 16, 17, 18 wherein the radiation from the excitation source is ultraviolet, near ultraviolet or visible radiation, or combinations and wherein the excitation source is daylight, fluorescent lamps, metal halide lamps, or other sources with sufficient electromagnetic energy to activate the selected photoluminescent material or materials.

21. The composition of any one of claims 15, 16, 17, and 19, wherein the photoluminescent fluorescent materials are applied from a photoluminescent composition comprising a liquid carrier wherein such photoluminescent fluorescent materials are soluble.

22. The composition of claim 14 wherein the photoluminescent composition comprises absorptive colorant pigments; an amount of said colorant pigments being selected to minimize negative impact on emission intensity and persistence of emission signature.

* * * * *

UNITED STATES PATENT AND TRADEMARK OFFICE
CERTIFICATE OF CORRECTION

PATENT NO. : 7,910,022 B2  
APPLICATION NO. : 11/808266  
DATED : March 22, 2011  
INVENTOR(S) : Satish Agrawal et al.

Page 1 of 1

It is certified that error appears in the above-identified patent and that said Letters Patent is hereby corrected as shown below:

In Col. 20, line 20 (Claim 2), "one or more of photoiuminescent" should read -- one or more photoluminescent --

In Col. 22, lines 4-5 (Claim 15), "comprise non-radioactive Group HA" should read -- comprise Group IIA --

Signed and Sealed this  
Tenth Day of May, 2011

David J. Kappos  
*Director of the United States Patent and Trademark Office*